US009300664B2

(12) United States Patent
Robison et al.

(10) Patent No.: US 9,300,664 B2
(45) Date of Patent: Mar. 29, 2016

(54) OFF-HOST AUTHENTICATION SYSTEM (71) Applicant: Dell Products L.P., Round Rock, TX (US)

(72) Inventors: Charles Robison, Buford, GA (US); Daniel Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 77 days.

(21) Appl. No.: 14/268,871

(22) Filed: May 2, 2014

(65) Prior Publication Data

US 2015/0319171 A1    Nov. 5, 2015

(51) Int. Cl.
    *H04L 29/06* (2006.01)

(52) U.S. Cl.
    CPC ........ *H04L 63/0869* (2013.01); *H04L 63/0823* (2013.01); *H04L 63/0807* (2013.01)

(58) Field of Classification Search
    CPC . H04L 63/0823; H04L 63/12; H04L 63/0869; H04L 63/0807; H04L 63/0853; H04L 9/0897; H04L 9/0844; H04L 9/3234; H04L 9/3263
    USPC ............................ 726/4–6; 713/169, 171, 176
    See application file for complete search history.

(56) References Cited

U.S. PATENT DOCUMENTS

| 5,781,723 | A  | * | 7/1998 | Yee ........................ G06F 9/4411 713/159 |
| 5,784,463 | A  | * | 7/1998 | Chen ........................ G06F 21/33 380/282 |
| 6,760,841 | B1 | * | 7/2004 | Fernandez ............. G06Q 20/04 705/55 |
| 8,352,739 | B2 |   | 1/2013 | Park et al. |
| 2002/0157010 | A1 | * | 10/2002 | Dayan ..................... G06F 21/80 713/191 |
| 2003/0115467 | A1 |   | 6/2003 | Aull et al. |
| 2013/0024688 | A1 |   | 1/2013 | Wen et al. |

FOREIGN PATENT DOCUMENTS

WO    WO 00/67447    11/2000

OTHER PUBLICATIONS

"Secure Microcontrollers Keep Data Safe—Microcontroller Solutions—DigiKey"; Dave Bursky, PRN Engineering Services; http://.digikey.com/us/en/techzone/lighting/resources/articles/secure-mictrocontrollers-keep-data-safe.html—Undated.
"Active Directory Authentication"; http://docs.oracle.com/cd/E19728-01/820-2550/activedir_auth.html , 1997-2007.
"Using Public Keys for Authentication—WinSCP"; http://winscp.net/eng/docs/public_key, Nov. 14, 2013.

* cited by examiner

*Primary Examiner* — Samson Lemma
(74) *Attorney, Agent, or Firm* — Hayes and Boone, LLP (57) ABSTRACT

An off-host authentication system includes a network. An off-host processing system is coupled to the network and sends an encrypted authentication item through the network in response to validating a user. An authentication information handling system (IHS) is coupled to the network and receives the encrypted authentication item from the off-host processing system through the network, decrypts the encrypted authentication item to produce a decrypted authentication item, validates the decrypted authentication item, and sends an approval message through the network. A directory system is coupled to the network and receives the approval message through the network and, in response, sends a user approval through the network. A host processing system, which is located in a user IHS that includes the off-host processing system and which is coupled to the network, logs a user into the user IHS in response to receiving the user approval through the network.

11 Claims, 6 Drawing Sheets

OFF-HOST AUTHENTICATION SYSTEM

BACKGROUND

The present disclosure relates generally to information handling systems, and more particularly to an off-host authentication system for an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs are secured by providing authentication systems on those IHSs that operate to authenticate users such that those users may use the IHS. Typically, a user will be required to provide some form of authentication credentials to the IHS, which may include a passcode, pass phrase, personal identification number, challenge response, fingerprint, retinal scan, face identification, voice identification, physical identification card, and/or a variety of other authentication credentials known in the art. In conventional IHSs, the authentication credentials are verified by a host processor in the IHS to determine whether the user is authorized to access the IHS and, if so, the user is logged into the IHS and allowed to access at least some functionality of the IHS. The authentication of a user by a host processor in the IHS raises a number of issues, as unauthorized persons may gain access to the host processor and manipulate the authentication process such that they gain access to the IHS.

Accordingly, it would be desirable to provide an improved authentication system.

SUMMARY

According to one embodiment, an off-host authentication system includes a network; an off-host processing system that is coupled to the network and that is configured to send an encrypted authentication item through the network in response to validating a user; an authentication information handling system (IHS) that is coupled to the network and that is configured to receive the encrypted authentication item from the off-host processing system through the network, decrypt the encrypted authentication item to produce a decrypted authentication item, validate the decrypted authentication item, and send an approval message through the network; a directory system that is coupled to the network and that is configured to receive the approval message through the network and, in response, send a user approval through the network; and a host processing system that is located in a user IHS that includes the off-host processing system, wherein the host processing system is coupled to the network and configured to log a user into the user IHS in response to receiving the user approval through the network.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
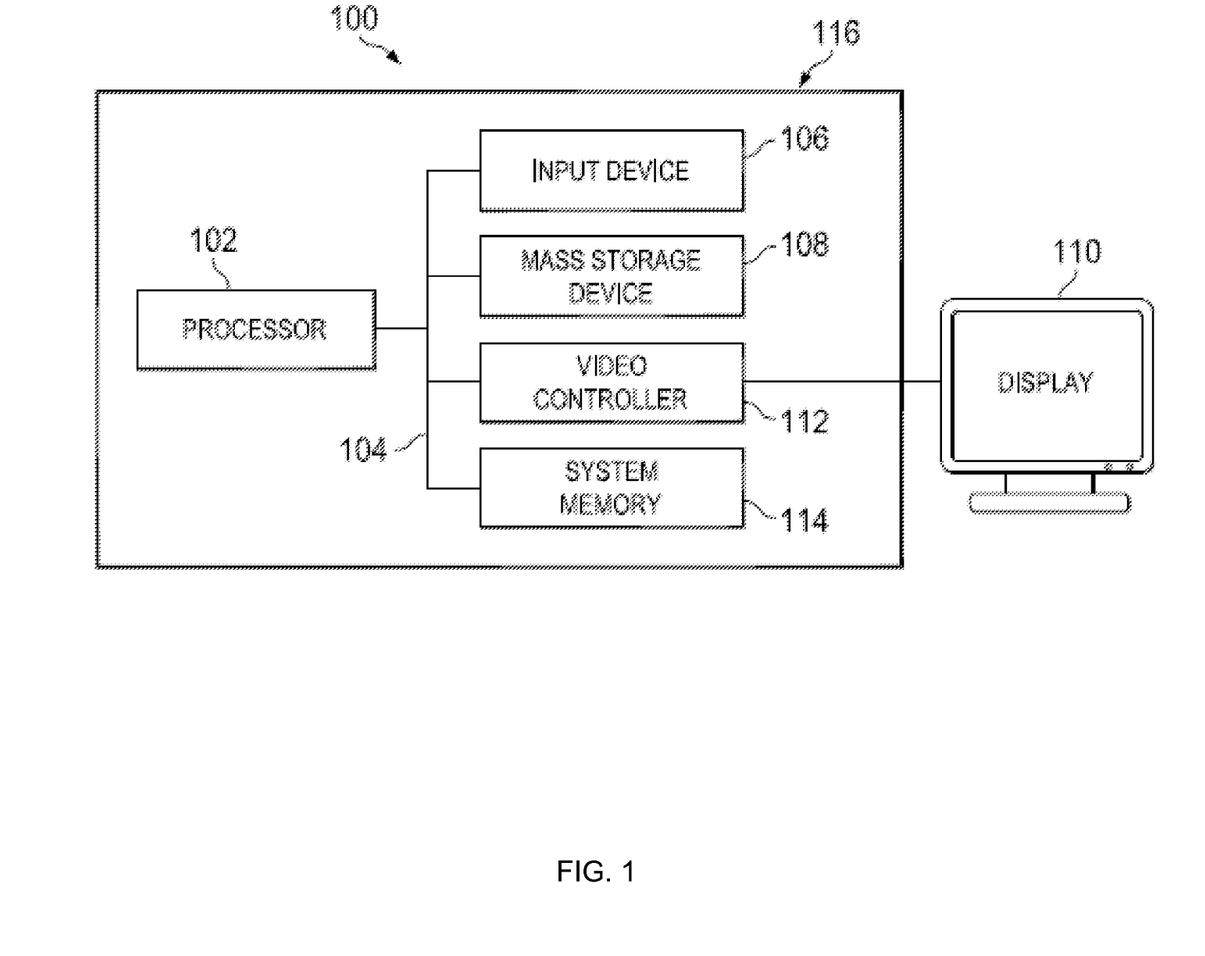
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
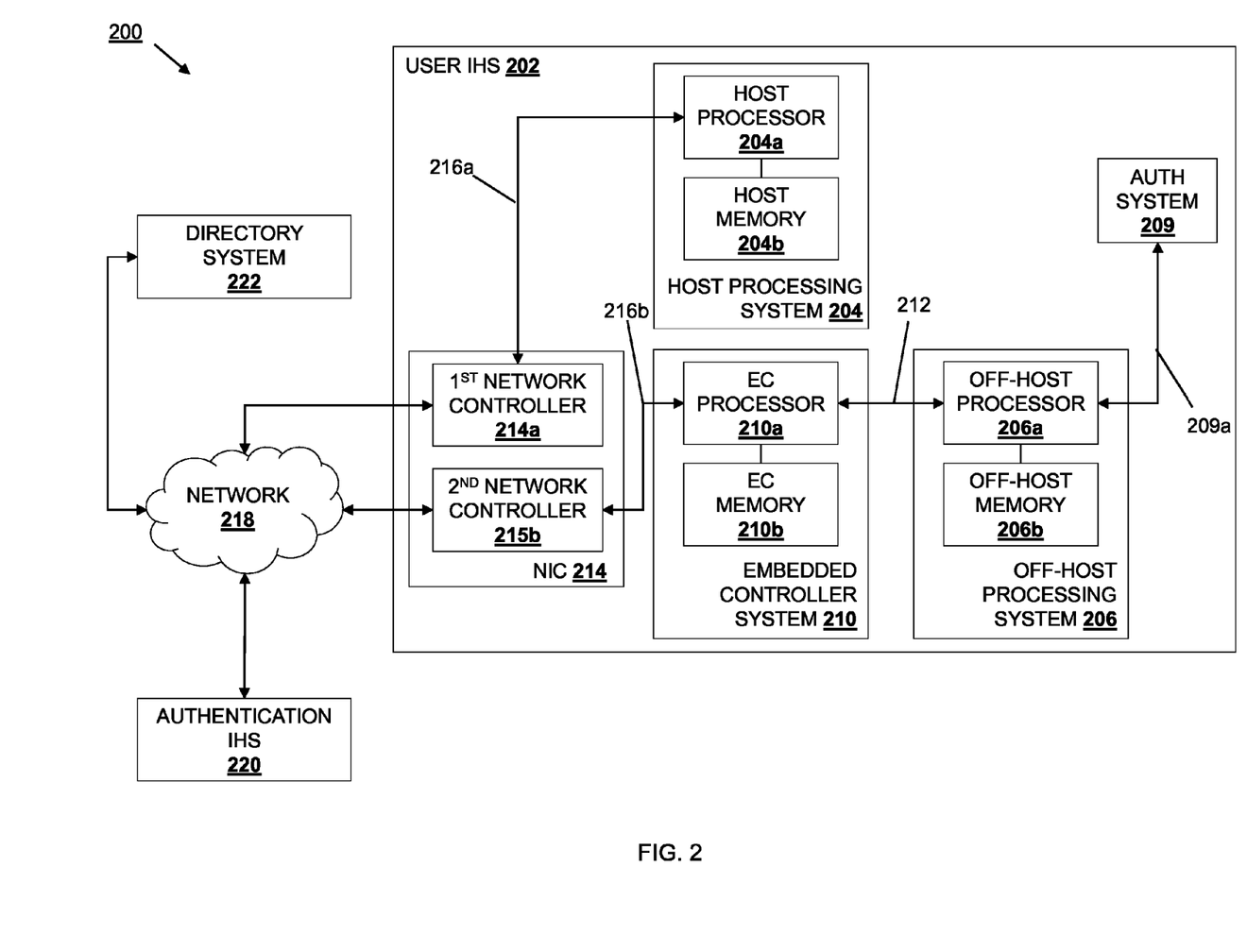
FIG. 2 is a schematic view illustrating an embodiment of an off-host authentication system.

Referring now to FIG. 2, an embodiment of an off-host authentication system 200 is illustrated. The off-host authentication system 200 includes a user IHS 202 which may be the IHS 100 discussed above with reference to FIG. 1 and/or include some or all of the components of the IHS 100. For example, the user IHS may be a server IHS, a desktop IHS, a laptop/notebook IHS, a tablet IHS, a mobile phone IHS, and/or a variety of other IHS's known in the art. The user IHS 202 includes a host processing system 204 that includes a host processor 204a, a host memory 204b, and/or a variety of other host processing components known in the art. For example, the host processor 204a in the host processing system 204 may include the processor 102 discussed above with reference to FIG. 1, and the host memory 204b in the host processing system 204 may include the system memory 114 discussed above with reference to FIG. 1. However, one of skill in the art in possession of the present disclosure will recognize that the host processing system 204 in the off-host authentication system 200 may be a variety of processing systems utilized by a user IHS 202 to perform processing functions related to, for example, running an operating system, while remaining within the scope of the present disclosure.

The user IHS 202 also includes an off-host processing system 206 that includes an off-host processor 206a, an off-host memory 206b, and/or a variety of other off-host processing components known in the art. For example, the off-host processor 206a in the off-host processing system 206 may include a secure processor that is segregated, distinct from, and/or otherwise separate from the processor 102 in the IHS 100 discussed above with reference to FIG. 1, and the off-host memory 206b in the off-host processing system 206 may include a memory device that is segregated, distinct from, and/or otherwise separate from the system memory 114 in the IHS 100 discussed above with reference to FIG. 1 such that the off-host memory 206b is accessible by the off-host processor 206a but not the host processor 204a. However, one of skill in the art in possession of the present disclosure will recognize that the off-host processing system 206 in the off-host authentication system 200 may be a variety of off-host processing systems that may be utilized by a user IHS 202 to perform secure processing functions while remaining within the scope of the present disclosure. In one example, the off-host processing system 206 may be provided, at least in part, using a ControlVault® system available from Dell, Inc. of Round Rock, Tex.

In an embodiment, the user IHS 202 is associated with at least one user IHS private key and at least one user IHS public key, discussed in further detail below. The at least one user IHS private key and the at least one user IHS public key may be stored in storage device that is accessible by the off-host processing system 206. For example, the at least one user IHS private key and the at least one user IHS public key may be stored on the off-host memory 206b, on the host memory 204b, and/or in a variety of other user IHS storage locations known in the art. Furthermore, as discussed below, the at least one user IHS public key may be shared with other systems such as, for example, the authentication IHS 220, discussed below.

The user IHS 202 also includes an authentication device 209 that may include, for example, an input device such as a keyboard, a fingerprint reader device or other biometric data reader device, a smart card reader device, an radio frequency identification (RFID) or Near Field Communication (NFC) device that is configured to wirelessly connect to a mobile user device (e.g., a mobile phone), and/or a variety of other authentication devices known in the art. The authentication device 209 may be coupled to the off-host processor 206 in the off-host processing system 206 via a USB or Smart Card Interface (SCI) bus 209a. However, the bus 209a may be any variety of physical/logical bus connections including but not limited to, the USB or SCI connection discussed above, a Thunderbolt interface, an 12C, an SPI, a PCI, and/or other bus connections known in the art.

The user IHS 202 also includes an embedded controller system 210 that includes an embedded controller processor 210a, an embedded controller memory 210b, and/or a variety of other embedded controller components known in the art. For example, the embedded controller processor 210a in the embedded controller system 210 may include a processor, and the embedded controller memory 210b in the embedded controller system 210 may include a memory device that includes instructions that, when executed by the embedded controller processor 210a, cause the embedded controller processor 210a to perform the functions of the embedded controller system 210 discussed below. However, one of skill in the art in possession of the present disclosure will recognize that the embedded controller system 210 in the off-host authentication system 200 may be a variety of embedded controller systems that may be utilized by a user IHS 202 to perform embedded controller functions while remaining within the scope of the present disclosure. In the illustrated embodiment, the embedded controller processor 210a is coupled to the off-host processor 206a via a bus 212 such as, for example, a LPC connection. However, the bus 212 may be any variety of physical/logical bus connections that support encrypted communications, including but not limited to, the LPC connection discussed above, a USB, a Thunderbolt interface, an 12C, an SPI, a PCI, and/or other bus connections known in the art The user IHS 202 also includes a network interface controller 214 that provides a first network controller 214a, a second network controller 214b, and/or that includes a variety of other network interface controller components known in the art. In some embodiments, the network interface controller 214 is compliant with Intel® Active Management Technology (AMT) and/or vPro technology. In an embodiment, the first network controller 214a in the network interface controller 214 may be segregated, distinct from, and/or otherwise separate from the second network controller 214b by assigning the first network controller 214a a first Media Access Control (MAC) address that is different from a second MAC address that is assigned to the second network controller 214b. However, one of skill in the art in possession of the present disclosure will recognize that the first network controller 214a and the second network controller 214b may be segregated from each other in a variety of manners (e.g., by providing the first network controller 214a on a different network interface controller than second network controller 214b, etc.) while remaining within the scope of the present disclosure. In the illustrated embodiment, the host processor 204a in the host processing system 204 is coupled to the first network controller 214a in the network interface controller 214 via a bus 216a, and the embedded controller processor 210a in the embedded controller system 210 is coupled to the second network controller 214b in the network interface controller 214 via a bus 216b. In some embodiments, the buses 216a and 216b may be part of the same bus such as, for example, an 12C connection that connects the host processing system 204 and the embedded controller system 210 to the network interface controller 214. However, the bus 214 may be any variety of physical/logical bus connections that support encrypted communications, including but not limited to, the 12C discussed above, a USB, a Thunderbolt interface, an SPI, a PCI, and/or other bus connections known in the art. The host processor 204a may be configured to only have access to the first network controller 214a by providing the host processor 204a a first MAC address that is assigned to the first network controller 214a, while the embedded controller processor 210a may be configured to only have access to the second network controller 214b by providing the embedded controller processor 210a a second MAC address that is assigned to the second network controller 214b. However, as discussed above, the first network controller 214a and the second network controller 214b may be provided on different network interface controllers such that the buses 216a and 216b are physically separate buses while remaining within the scope of the present disclosure.

Each of the first network controller 214a and the second network controller 214b are coupled to a network 218 such as, for example, a local area network (LAN), the Internet, and/or a variety of other networks known in the art. An authentication IHS 220 is also coupled to the network 218. In an embodiment, the authentication IHS 220 may be the IHS 100 discussed above with reference to FIG. 1 and/or may include some or all of the components of the IHS 100. For example, the authentication IHS 220 may be a server IHS or authentication server that may operates to verify user authentication credential inputs and/or verify authentication tokens for the off-host authentication system 200, discussed in further detail below. However, one of skill in the art in possession of the present disclosure will recognize that functionality of the authentication IHS 220 in the off-host authentication system 200 may be provided by a variety of systems known in the art while remaining within the scope of the present disclosure. In an embodiment, the authentication IHS 220 is associated with at least one authentication IHS private key and at least one authentication IHS public key, discussed in further detail below. The at least one authentication IHS private key and the at least one authentication IHS public key may be stored in storage device that is accessible by the authentication IHS 220.

A directory system 222 is also coupled to the network 218. In an embodiment, the directory system 222 may include an active directory service available from Microsoft Corporation of Redmond, Wash. For example, the directory system 222 may include an active directory service that is provided on a server IHS and that operates to authenticate and authorize users, assign and enforce security policies, install and update software, and/or perform a variety of other directory system functions known in the art. However, one of skill in the art in possession of the present disclosure will recognize that functionality of the directory system 222 in the off-host authentication system 200 may be provided by a variety of systems known in the art while remaining within the scope of the present disclosure. In an embodiment, the network 218, the authentication IHS 220, and the directory system 222 may be controlled by the same entity. For example, a business or government entity may provide, house, and otherwise maintain control of each of the network 218, the authentication IHS 220, and the directory system 222 in order to provide an increased level of security using the off-host authentication system 200.

Figure 3:
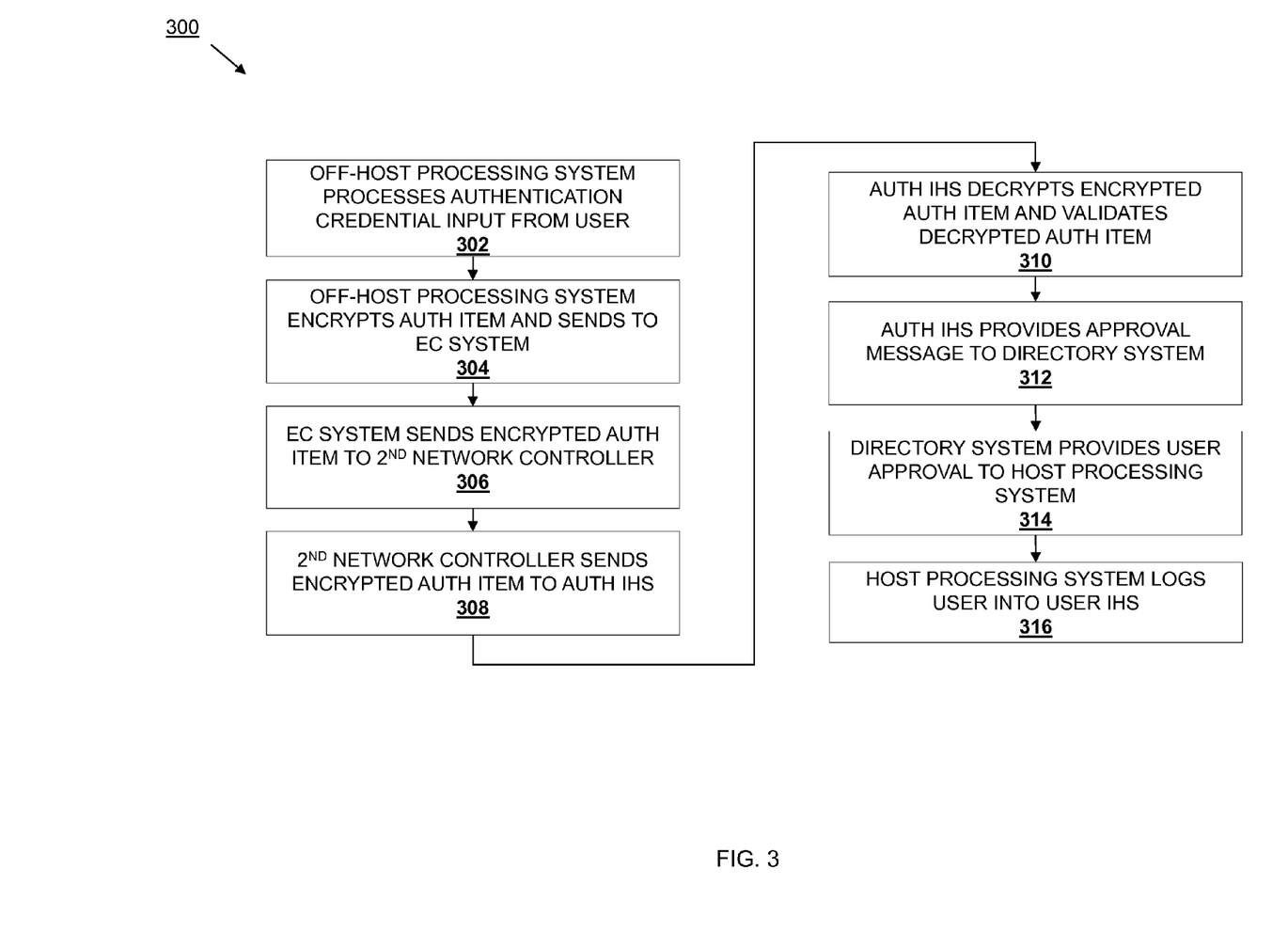
FIG. 3 is a flow chart illustrating an embodiment of a method for off-host authentication.
Figure 4:
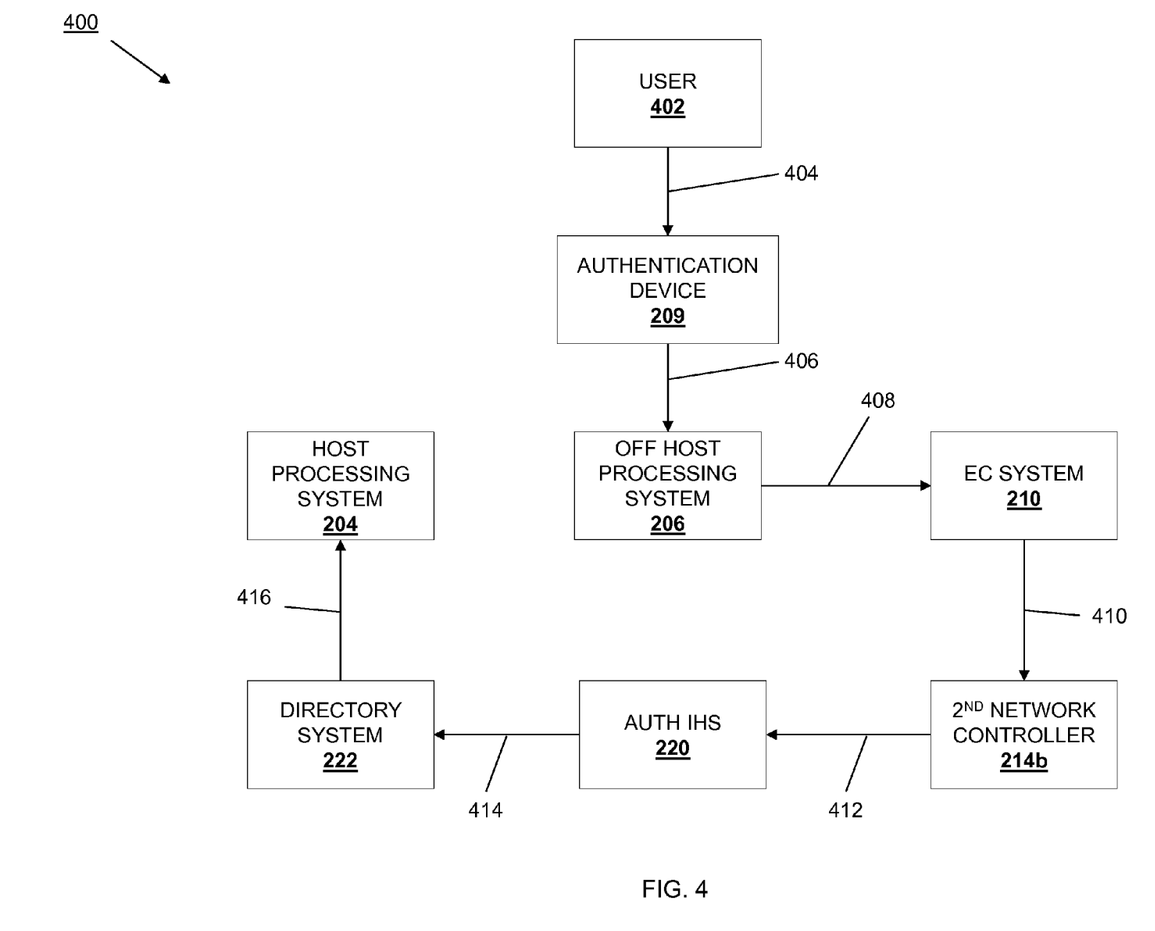
FIG. 4 is a schematic flow diagram illustrating an embodiment of the communication in the off-host authentication system of FIG. 2 during the method of FIG. 3.

Referring now to FIGS. 2, 3, and 4, an embodiment of a method 300 for providing off-host authentication is illustrated. In the embodiments discussed below, the user IHS 202 in the off-host authentication system 200 is a secure user IHS that only provides access to IHS functionality in response to a user being authenticated by the off-host authentication system 200. For example, a system administrator may have previously (e.g., prior to the method 300) identified one or more users as authenticated users that may access IHS functionality of the user IHS 202 that is provided by the host processing system 204, and registered those authenticated users with the authentication IHS 220 and/or the off-host processing system 206. The identification and registration of authenticated users may include associating authentication credentials of the authenticated users with access to the user IHS (or one of a plurality of different levels of access to the user IHS 202 that may vary in IHS functionality) in a storage device of the authentication IHS 220 and/or the off-host memory 206b. However, one of skill in the art in possession of the present disclosure will recognize that the off-host authentication system 200 will be beneficial for a variety of other authentication systems that are not explicitly illustrated and described herein and thus its application to those other authentication systems is envisioned as falling within the scope of the present disclosure. The method 300 is described below with reference to the schematic flow 400 of FIG. 4 that illustrates an embodiment of the flow of communications between the components of the off-host authentication system 200 during the method 300.

The method 300 begins at block 302 where the off-host processing system processes an authentication credential input that is received from a user. As illustrated in FIG. 4, a user 402 performs an authentication action 404 using the authentication device 209, and the authentication device 209 then sends an authentication credential input 406 over the bus 209a to the off-host processing system 206. For example, the user 402 may perform the authentication action 404 by using a keyboard authentication device to provide a username and passcode; by using a biometric authentication device to provide a fingerprint scan, retinal scan, and/or other biometric authentication credential; by using a smart card reader device to provide authentication information stored on a smart card; by using a mobile user device to wirelessly transmit an authentication credential stored on the mobile user device to an RFID or NFC authentication device; etc., and the authentication device 209 will then convert that authentication action 404 into the authentication credential input 406 and send that authentication credential input 406 over the bus 209a to the off-host processor 206a in the off-host processing system 206. While a few examples have been provided, one of skill in the art in possession of the present disclosure will recognize that the user 402 may provide, and the off-host processing system 206 may receive, the authentication credential input in a variety of manners that will fall within the scope of the present disclosure.

In some embodiments the off-host processing system 206 may operate at block 302 to process the authentication credential input by using the authentication credential input received from the authentication device 209 to validate the user 402 locally (i.e., within the user IHS 202). For example, the off-host processor 206a may compare the received authentication credential input to valid authentication credentials (e.g., that were previously provided by a system administrator) that are stored in the off-host memory 206b to determine whether the received authentication credential input matches any valid authentication credentials that are associated with authenticated users in the off-host authentication system 200. In specific embodiments, the off-host processor 206a may process the received authentication credential input (e.g., provided via a fingerprint scan authentication action) to produce a candidate authentication credential (e.g., a candidate fingerprint), and compare that candidate authentication credential to authentication credential templates (e.g., fingerprint patterns) stored in the off-host memory 206b to determine whether the candidate authentication credential matches any of the authentication credential templates. Processing of the candidate fingerprint may include determining a center point of the candidate fingerprint, centering on that center point, and aligning the candidate fingerprint with an orientation of fingerprint templates that are stored in the off-host memory 206b such that the candidate fingerprint may be compared to the fingerprint templates that are stored in the off-host memory 206b to determine whether a match exists, and/or a variety of other candidate authentication credential processing functions known in the art.

In other embodiments the off-host processing system 206 may operate at block 302 to process the authentication credential input for authentication by a non-local system (i.e., outside of the user IHS 202). For example, the off-host processor 206a may perform the processing of the candidate authentication credential in substantially the same manner as discussed above, but with the provision that authentication credential templates are not stored in the off-host memory 206b such that the off-host processor 206a does not compare the processed candidate authentication credential to authentication credential templates. Such embodiments may provide for the storage of authentication credential templates outside of the user IHS 202 in order to, for example, provide an additional level of security to the off-host authentication system 200. While a few examples of the processing of an authentication credential input have been provided, one of skill in the art in possession of the present disclosure will recognize that a wide variety of authentication credential input processing functions will fall within the scope of the present disclosure. As discussed above, the host processor 204a in the host processing system 204 may be segregated, distinct from, and/or otherwise separate from the off-host processing system 206 and, as such, any control of the host processing system 204 (e.g., by an unauthorized user) will not result in access to the authentication credential input provided by the user 402 and processed by the off-host processing system 206.

The method 300 then proceeds to block 304 where the off-host processing system encrypts an authentication item and sends the encrypted authentication item to the embedded controller system. In an embodiment, following the processing of the authentication credential input at block 302, the off-host processor 206a operates to encrypt an authentication item and send that encrypted authentication item 408 over the bus 212 to the embedded controller processor 210a in the embedded controller system 210. In embodiments where the authentication credential input was processed to validate the user 402 locally (i.e., within the user IHS 202), discussed above, the off-host processor 206a operates at block 304 to retrieve an authentication token from the off-host memory 206b, encrypt the authentication token to produce an encrypted authentication token (i.e., the encrypted authentication item in this embodiment), and send the encrypted authentication token over the bus 212 to the embedded controller system 210. For example, the off-host processor 206a may retrieve an authentication token from the off-host memory 206b that is also stored in the authentication IHS 220, encrypt that authentication token with a user IHS private key and an authentication IHS public key to produce the encrypted authentication token, and send the encrypted authentication token over the bus 212 to the embedded controller processor 210a. In an embodiment, the off-host processing system 206 also sends user IHS information along with the encrypted authentication token. For example, the off-host processor 206a may retrieve information about the user IHS 202 such as, for example, hardware information (e.g., unique identifiers) for attached devices (e.g., a Trusted Platform Module (TPM), the off-host processor 206a, the host processor 204a, etc.), BIOS information, and/or a variety of other user IHS information known in the art, and send that user IHS information along with the encrypted authentication token to the embedded controller processor 210a.

In embodiments where the authentication credential input is processed for authentication by a non-local system to produce the processed authentication credential, discussed above, the off-host processor 206a operates at block 304 to encrypt the processed authentication credential to produce an encrypted processed authentication credential (i.e., the encrypted authentication item in this embodiment), and send the encrypted processed authentication credential over the bus 212 to the embedded controller system 210. For example, the off-host processor 206a may encrypt the processed authentication credential with a user IHS private key and an authentication IHS public key to produce the encrypted processed authentication credential, and send the encrypted processed authentication credential over the bus 212 to the embedded controller processor 210a. Similarly as discussed above, the off-host processing system 206 may also sends user IHS information along with the encrypted processed authentication credential. For example, the off-host processor 206a may retrieve information about the user IHS 202 such as, for example, hardware information (e.g., unique identifiers) for attached devices (e.g., a Trusted Platform Module (TPM), the off-host processor 206a, the host processor 204a, etc.), BIOS information, and/or a variety of other user IHS information known in the art, and send that user IHS information along with the encrypted processed authentication credential to the embedded controller processor 210a. As discussed above, the host processor 204a in the host processing system 204 may be segregated, distinct from, and/or otherwise separate from the off-host processing system 206 and, as such, any control of the host processing system 204 (e.g., by an unauthorized user) will not result in access to the authentication token/processed authentication credential or public/private keys used by the off-host processing system 206 in the encryption operations discussed above.

The method 300 then proceeds to block 306 where the embedded controller system sends the encrypted authentication item to the second network controller. In an embodiment, the embedded controller processor 210a operates at block 306 to send the encrypted authentication item 410 that was received from the off-host processor 206a over the bus 216b to the second network controller 214b in the network interface controller 214. For example, the embedded controller processor 210a may use the second MAC address assigned to the second network controller 214b to send the encrypted authentication item to the second network controller 214b. As discussed above, the first network controller 214a in the network interface controller 214 may be segregated, distinct from, and/or otherwise separate from the second network controller 214b by assigning the first network controller 214a a first MAC address that is different from a second MAC address that is assigned to the second network controller 214b and, as such, any control of the host processing system 204 (e.g., by an unauthorized user) will not result in access to the encrypted authentication item (i.e., because the host processing system 204 does not have access to the second network controller 214b).

The method 300 then proceeds to block 308 where the second network controller sends the encrypted authentication item to the authentication IHS. In an embodiment, the second network controller 214b operates at block 308 to send the encrypted authentication item 412 received from the embedded controller processor 210a over the network 218 to the authentication IHS 220. In an embodiment, the second network controller 214b may have access to the authentication IHS 220 over the network 218 that is not provided to the first network controller 214a, and at block 308 may use that access to send the encrypted authentication item to the authentication IHS 220. In such embodiments, the restriction of access to the authentication IHS 220 to the second network controller 214b prevents any control of the host processing system 204 (e.g., by an unauthorized user) from resulting in access to the authentication IHS 220 (i.e., because the host processing system 204 only has access to the first network controller 214a).

The method 300 then proceeds to block 310 where the authentication IHS decrypts the encrypted authentication item and validates the decrypted authentication item. In an embodiment of block 310, the authentication IHS 220 operates to decrypt the encrypted authentication item received from the second network controller 214b to produce a decrypted authentication item and then validates that decrypted authentication item by determining if the decrypted authentication item matches an authentication item stored in the authentication IHS 220. In embodiments where the authentication credential input was processed by the off-host processing system 206 to validate the user 402 locally (i.e., within the user IHS 202), discussed above, the authentication IHS 220 operates to decrypt the encrypted authentication token to produce a decrypted authentication token, and then determines whether the decrypted authentication token matches an authentication token that is stored in the authentication IHS 220 in order to validate that decrypted authentication token. For example, the authentication IHS 220 may receive the encrypted authentication token, decrypt the encrypted authentication token using a authentication IHS private key and a user IHS public key to produce the decrypted authentication token, and check a database in the authentication IHS 220 to validate the decrypted authentication token by determining whether that decrypted authentication token matches an authentication token in that database. If the decrypted authentication token does not match an authentication token that is stored in the authentication IHS 220, the authentication IHS 220 sends a message to the directory system 222 that the user 402 is not authorized to access the user IHS 202, and the directory system 222 communicates with the user IHS 220 (e.g., the off-host processing system 206, the host processing system 204, etc.) to inform the user IHS 202 that the user is not authorized to access the user IHS 202. If the decrypted authentication token matches an authentication token that is stored in the authentication IHS 220, the authentication IHS 220 validates the decrypted authentication token.

In embodiments where the authentication credential input was processed by the off-host processing system 206 to produce the processed authentication credential, discussed above, the authentication IHS 220 operates to decrypt the encrypted processed authentication credential to produce a decrypted processed authentication credential, compare the decrypted processed authentication credential to valid authentication credentials (e.g., that were previously provided by a system administrator) that are stored in the authentication IHS 220 to validate the decrypted processed authentication credential by determining whether the decrypted processed authentication credential matches any valid authentication credentials that are associated with authenticated users in the authentication IHS 220. For example, the authentication IHS 220 may receive the encrypted processed authentication credential, decrypt the encrypted processed authentication credential using a authentication IHS private key and a user IHS public key to produce the decrypted processed authentication credential, and check a database in the authentication IHS 220 to validate the decrypted processed authentication credential by determining whether that decrypted processed authentication credential matches a valid authentication credential in that database. If the decrypted processed authentication credential does not match a valid authentication credential that is stored in the authentication IHS 220, the authentication IHS 220 sends a message to the directory system 222 that the user 402 is not authorized to access the user IHS 202, and the directory system 222 communicates with the user IHS 220 (e.g., the off-host processing system 206, the host processing system 204, etc.) to inform the user IHS 202 that the user is not authorized to access the user IHS 202. If the decrypted processed authentication credential matches a valid authentication credential that is stored in the authentication IHS 220, the authentication IHS 220 validates the decrypted processed authentication credential.

The method 300 then proceeds to block 312 where the authentication IHS provides an approval message and user IHS information to the directory system. In an embodiment, following the validation of the decrypted authentication item, the authentication IH 220 operates to send an approval message 414 to the directory system 222 over the network 218. For example, the authentication IHS 220 may send the directory system 222 an approval message that indicates that the authentication item sent from the off-host processing system 206 at block 304 has been validated (e.g., "user 402 authenticated by authentication IHS 220"). In addition, the authentication IHS 220 may send user IHS information along with the approval message. In one example, the authentication IHS 220 may send the information about the user IHS 202 that was sent by the off-host processing system 206 at block 304. In another example, the authentication IHS 220 may retrieve information about the user IHS 202 such as, for example, the name of the user 402, the name of the user IHS 202, and/or a variety of other user IHS information known in the art, and send that user IHS information along with the approval message to the directory system 222.

The method 300 then proceeds to block 314 where the directory system provides a user approval to the host processing system. In an embodiment, in response to receiving the approval message from the authentication IHS 220, the directory system 222 provides an authentication token 416 (e.g., the user approval in this embodiment) to the host processing system 204. For example, the directory system 222 may retrieve an authentication token from a storage device in the directory system 222 and send that authentication token over the network 218 to the first network controller 214a such that is it sent over the bus 216a by the first network controller 214a to the host processor 204a in the host processing system 204. The method 300 then proceeds to block 316 where the host processing system logs the user into the user IHS. In an embodiment, in response to receiving the authorization token from the directory system 222, the host processor 204a operates at block 316 to log the user 402 into the user IHS 202 such that the user 402 may access functionality of the user IHS 202 including, for example, an operating system. For example, the authorization token provided by the directory system 222 may be a Kerberos protocol token that allows the user 402 to automatically log into the user IHS 202 and that may be used by the host processing system 204 to access network resources.

Thus, systems and methods for out-of-band authentication have been described that provide for a user to authenticate to an off-host processing system in order to access the functionality of a user IHS that is provided by a host processing system. The authentication of a user to access the functionality of a user IHS is controlled by the off-host processing system, an authentication IHS, and a directory system that operate to verify the user and release a token to the host processing system that provides the user access to the functionality of the user IHS. In some embodiments, the verification of the user may be performed by the authentication IHS such that the user IHS never stores authentication credentials for a user, while authentication tokens are encrypted and exchanged between the off-host processing system and the authentication IHS such that the authentication IHS can send an approval message to the directory system to provide for the release of a token to the host processing system that allows the user access to the user IHS if they have been validated. Because the host processing system and the off-host processing system need not interact in the out-of-band authentication system, the host processing system and the off-host processing system may be physically segregated (e.g., there may be no communications bus connecting the host processing system and the off-host processing system) to prevent any access or compromise of the host processing system from enabling an unauthorized user to access functionality of the user IHS 202.

Figure 5:
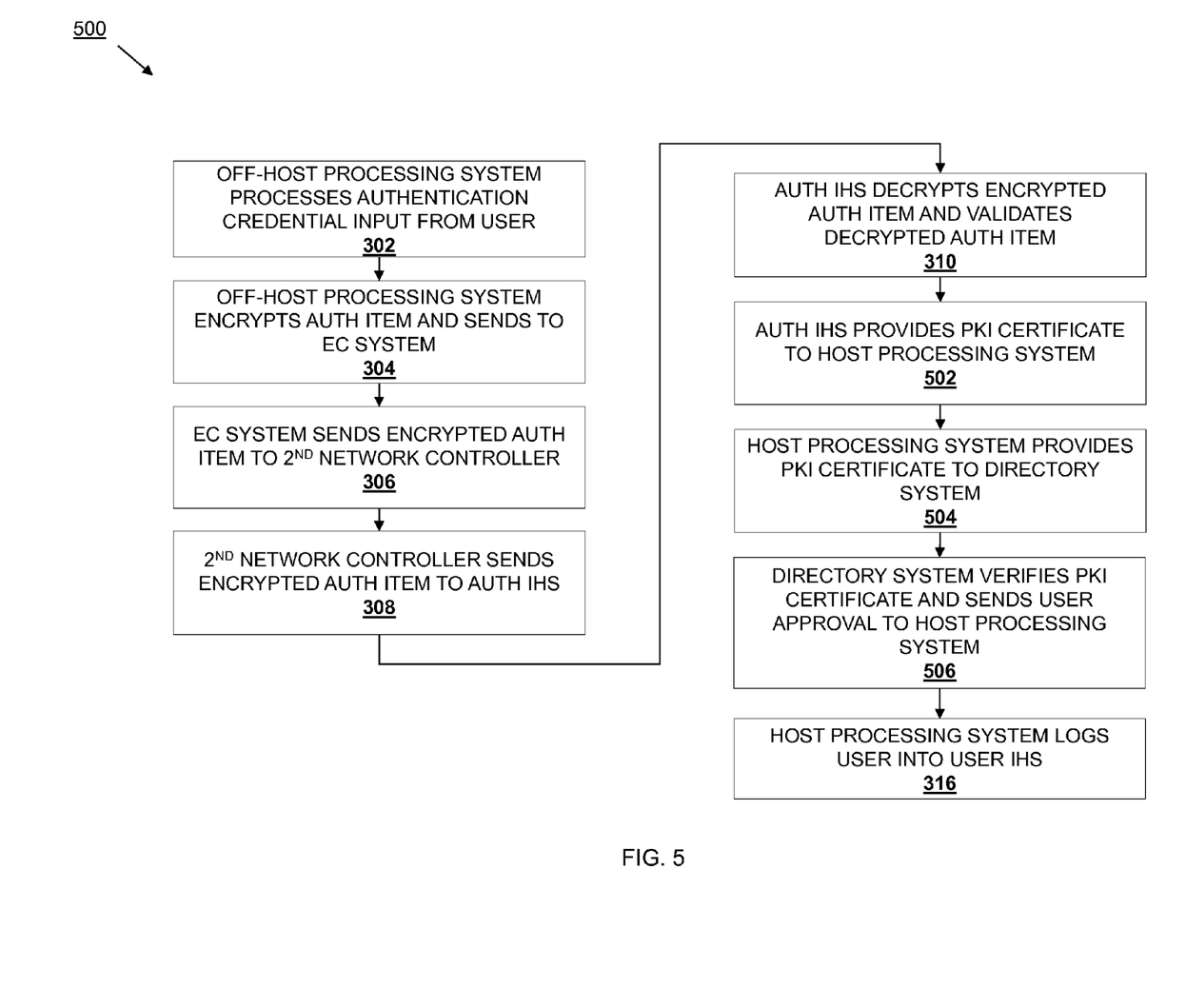
FIG. 5 is a flow chart illustrating an embodiment of a method for off-host authentication.
Figure 6:
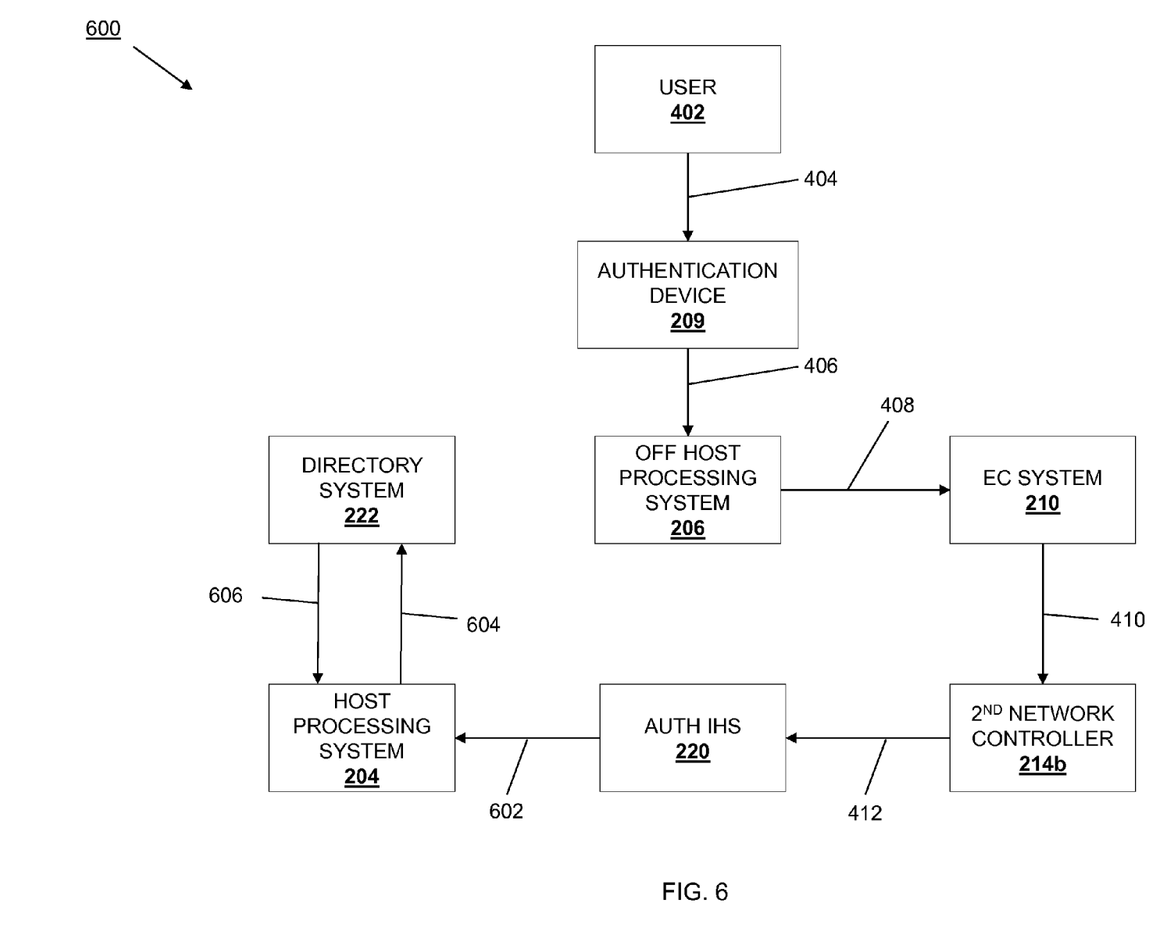
FIG. 6 is a schematic flow diagram illustrating an embodiment of the communication in the off-host authentication system of FIG. 2 during the method of FIG. 5.

Referring now to FIGS. 2, 5, and 6, an embodiment of a method 500 for providing off-host authentication is illustrated that is substantially similar to the method 300 but with blocks 502, 504, and 506 replacing block 312 and 314. As such, the operation of the out-of-band authentication system 200 according to blocks 302, 304, 306, 308, 310, and 316 of the method 500 is substantially similar as described above for the method 300, and thus is not repeated below in the discussion of the method 500. The method 500 is described below with reference to the schematic flow 600 of FIG. 6 that illustrates an embodiment of the flow of communications between the components of the off-host authentication system 200 during the method 500.

Following block 310 of the method 300 where the authentication IHS decrypts the encrypted authentication item and validates the decrypted authentication item, discussed above, the method 300 then proceeds to block 502 where the authentication IHS provides an approval message, which in this embodiment is an asymmetric key pair protected message such as, for example, the public key infrastructure (PKI) certificate discussed below, to the host processing system. While a PKI certificate that, as known in the art, involves a trusted certificate authority is used in the examples below, other types of asymmetric key pair protected messages that do not involve a trusted authority will fall within the scope of the present disclosure. In an embodiment, following the validation of the decrypted authentication item, the authentication IHS 220 operates to retrieve an access request token (which may be a "certificate") that is associated with the decrypted authentication item in a database in the authentication IHS 220, protect that access request token with an asymmetric key pair, and send the asymmetric key pair protected access request token 602 (e.g., the PKI certificate) over the network 218 to the first network controller 214a such that the first network controller 214a sends that asymmetric key pair protected access request token 602 over the bus 216a to the host processor 204a in the host processing system 204. For example, the authentication IHS 220 may encrypt the access request token using a public key of the host processing system 204, and then encrypt that public-key-encrypted access request token using a private key of the authentication IHS 220. In an embodiment, a PKI certificate used at block 502 may include a digital certificate that is created by the authentication IHS 220 (e.g., a certificate authority) by digitally signing a set of data that may include a name of the user 402 and/or other attributes that uniquely identify the user 402 (e.g., an employee number), a public key associated with the user 402, a validity period of the PKI certificate, an authentication operation for which the public key associated with the user 402 will be used, and/or a variety of other PKI certificates elements known in the art. In some embodiments, the host processor 204a may store the PKI certificate received at block 502 in the host memory 204b.

The method 300 then proceeds to block 504 where the host processing system provides the approval message, which in this embodiment is the PKI certificate, to the directory system. In some embodiments of block 504, the host processor 204a may decrypt the asymmetric key pair protected access request token using the public key of the authentication IHS 220 and its private key, encrypt the resulting access request token with a public key of the directory system 222, and encrypt that public-key-encrypted access request token with the private key of the host processing system 204. The host processor 204a may then send that asymmetric key pair protected access request token 604 (e.g., the PKI certificate) through the bus 216a to the first network controller 214a such that the first network controller 214a sends that asymmetric key pair protected access request token 604 over the network 218 to the directory system 222. In some embodiments, the host processor 204a may store the asymmetric key pair protected access request token 602 received from the authentication IHS 220 in the host memory 204b, while in other embodiments of block 504, the host processor 204a may immediately process and forward the asymmetric key pair protected access request token 602 received from the authentication IHS 220 (i.e., without storing that PKI certificate in the host memory 204b) through the bus 216a to the first network controller 214a such that the first network controller 214a sends that asymmetric key pair protected access request token 604 over the network 218 to the directory system 222.

The method 300 then proceeds to block 506 where the directory system verifies the approval message, which in this embodiment is the PKI certificate, and sends a user approval to the host processing system. In an embodiment, in response to receiving the PKI certificate from the host processing system 204, the directory system 222 operates at block 506 to determine whether the PKI certificate is valid and, if so, sends a user approval 606 over the network 218 to the first network controller 214a such that the user approval 606 is sent to the host processor 204a. For example, the directory system 222 may decrypt the asymmetric key pair protected access request token 604, verify the resulting access request token, create an access token (e.g., a Kerberos protocol token), encrypt that access token with a public key of the host processing system 204, and encrypt the public-key-encrypted access token with a private key of the directory system 222. The directory system 222 may the send the asymmetric key pair protected access token 606 (e.g., the user approval) over the network 218 to the host processing system 204. The method 300 then proceeds to block 316 where the host processing system logs the user into the user IHS. In an embodiment, in response to receiving the user approval from the directory system 222, the host processor 204a operates at block 316 to log the user 402 into the user IHS 202 such that the user 402 may access functionality of the user IHS 202 including, for example, an operating system. In an embodiment, the host processing system 204 may decrypt the asymmetric key pair protected access token 606 received from the directory system 222 and provide that access token to any resource that requests authentication in the network.

Thus, systems and methods for out-of-band authentication have been described that provide for a user to authenticate to an off-host processing system in order to access the functionality of a user IHS that is provided by a host processing system. The authentication of a user to access the functionality of a user IHS is controlled by the off-host processing system, an authentication IHS, and a directory system that operate to verify the user and release a token to the host processing system that provides the user access to the functionality of the user IHS. In some embodiments, the verification of the user may be performed by the authentication IHS such that the user IHS never stores authentication credentials for a user, while authentication tokens are encrypted and exchanged between the off-host processing system and the authentication IHS such that the authentication IHS can send PKI certificate to the host processing system that is then provided by the host processing system to the directory system to obtain a user approval from the directory system that allows the user access to the user IHS. Because the host processing system and the off-host processing system need not interact in the out-of-band authentication system, the host processing system and the off-host processing system may be physically segregated (e.g., there may be no communications bus connecting the host processing system and the off-host processing system) to prevent any access or compromise of the host processing system from enabling an unauthorized user to access functionality of the user IHS 202.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An off-host authentication system, comprising:
   a network;
   an off-host processing system that is coupled to the network and that is configured to send an encrypted authentication item through the network in response to validating a user;
   an authentication information handling system (IHS) that is coupled to the network and that is configured to receive the encrypted authentication item from the off-host processing system through the network, decrypt the encrypted authentication item to produce a decrypted authentication item, validate the decrypted authentication item, and send an approval message through the network;
   a directory system that is coupled to the network and that is configured to receive the approval message directly from the authentication IHS through the network and, in response, send a user approval that includes an authentication token through the network; and
   a host processing system that is located in a user IHS that includes the off-host processing system, wherein the host processing system is coupled to the network and configured to log a user into the user IHS in response to receiving the user approval through the network from the directory system; and
   wherein at least one of the off-host processing system, the authentication IHS, the directory system, and the host processing system utilizes a hardware processor.

2. The system of claim 1, further comprising:
   a network controller system that couples the off-host processing system to the network, wherein the network controller is configured to forward the encrypted authentication item to the authentication IHS through the network.

3. The system of claim 2, further comprising:
   an embedded controller system that couples the off-host processing system to the network controller, wherein the embedded controller system is configured to forward the encrypted authentication item from the off-host processing system to the network controller.

4. The system of claim 1, wherein the encrypted authentication item includes an authentication item that is encrypted by the off-host processing system with a user IHS private key and an authentication IHS public key, and wherein the authentication IHS is configured to decrypt the encrypted authentication item with an authentication IHS private key and a user IHS public key.

5. A user information handling system (IHS), comprising:
   a user IHS chassis;
   a first network controller that is housed in the user IHS chassis;
   an off-host processing system that is housed in the user IHS chassis and that is coupled to the first network controller, wherein the off-host processing system is configured to provide an encrypted authentication item to an authentication IHS over a network through the first network controller in response to validating a user, and wherein the encrypted authentication item is configured to cause the authentication IHS to send an approval message through the network;
   a second network controller that is housed in the user IHS chassis; and
   a host processing system that is housed in the user IHS chassis and that is coupled to the second network controller, wherein the host processing system is configured to log a user into an operating system in response to receiving a user approval that includes an authentication token from a directory system, wherein the user approval is sent by the directory system over the network in response to receiving the approval message directly from the authentication IHS; and
   wherein at least one of the off-host processing system and the host processing system utilizes a hardware processor.

6. The IHS of claim 5, further comprising:
   an embedded controller system that couples the off-host processing system to the first network controller, wherein the embedded controller system is configured to forward the encrypted authentication item from the off-host processing system to the first network controller.

7. The IHS of claim 5, further comprising:
   wherein the encrypted authentication item includes an authentication item that is encrypted by the off-host processing system with a user IHS private key and an authentication IHS public key, and wherein the authentication IHS is configured to decrypt the encrypted authentication item with an authentication IHS private key and a user IHS public key.

8. The IHS of claim 5, wherein the encrypted authentication item includes user IHS information.

9. A method for providing off-host authentication, comprising:
   sending, by an off-host processing system, an encrypted authentication item through a network in response to validating a user;

receiving, by an authentication IHS, the encrypted authentication item from the off-host processing system through the network and, in response, decrypting the encrypted authentication item to produce a decrypted authentication item, validating the decrypted authentication item, and sending an approval message through the network;

receiving, by a directory system, the approval message directly from the authentication IHS through the network and, in response, sending a user approval that includes an authentication token through the network; and logging, by a host processing system, a user into the user IHS in response to receiving the user approval through the network from the directory system; and wherein at least one of the off-host processing system, the authentication IHS, the directory system, and the host processing system utilizes a hardware processor.

10. The method of claim 9, further comprising:

forwarding, by an embedded controller, the encrypted authentication item from the off-host processing system to a network controller; and forwarding, by the network controller, the encrypted authentication item to the authentication IHS through the network.

11. The method of claim 9, further comprising:

encrypting, by the off-host processing system, an authentication item with a user IHS private key and an authentication IHS public key to produce the encrypted authentication item; and decrypting, by the authentication IHS, the encrypted authentication item with an authentication IHS private key and a user IHS public key.

* * * * *